US012565931B2

(12) United States Patent　(10) Patent No.:　US 12,565,931 B2
Li et al.　(45) Date of Patent:　Mar. 3, 2026

(54) DEVICE SEALED WITH MAGNETIC LIQUID

(71) Applicants: BEIJING JIAOTONG UNIVERSITY, Beijing (CN); TSINGHUA UNIVERSITY, Beijing (CN)

(72) Inventors: Decai Li, Beijing (CN); Zhibin Wang, Beijing (CN); Sijia Liu, Beijing (CN); Xinzhi He, Beijing (CN)

(73) Assignees: BEIJING JIAOTONG UNIVERSITY, Beijing (CN); TSINGHUA UNIVERSITY, Beijing (CN)

( * ) Notice: Subject to any disclaimer, the term of this patent is extended or adjusted under 35 U.S.C. 154(b) by 133 days.

(21) Appl. No.: 18/496,534

(22) Filed: Oct. 27, 2023

(65) Prior Publication Data

US 2024/0141998 A1　May 2, 2024

(30) Foreign Application Priority Data

Oct. 31, 2022　(CN) ......................... 202211346154.7

(51) Int. Cl.
F16J 15/43　(2006.01)
(52) U.S. Cl.
CPC .................................... F16J 15/43 (2013.01)
(58) Field of Classification Search
CPC ........................................................ F16J 15/43
See application file for complete search history.

(56) References Cited

U.S. PATENT DOCUMENTS

| | | | | |
|---|---|---|---|---|
| 4,407,518 A * | 10/1983 | Moskowitz | .............. | F16J 15/43 277/928 |
| 4,486,026 A * | 12/1984 | Furumura | .............. | G11B 19/20 277/366 |
| 4,526,380 A * | 7/1985 | Raj | .......................... | F16J 15/43 384/477 |
| 4,526,382 A * | 7/1985 | Raj | .......................... | F16J 15/43 277/410 |
| 2011/0018255 A1* | 1/2011 | Takahashi | ................ | F16J 15/43 285/125.1 |
| 2015/0316101 A1* | 11/2015 | Honda | ................... | F16C 33/765 277/410 |

* cited by examiner

*Primary Examiner* — Christine M Mills
*Assistant Examiner* — L. Susmitha Koneru
(74) *Attorney, Agent, or Firm* — Hodgson Russ LLP

(57) ABSTRACT

Provided is a device sealed with a magnetic liquid. The device includes: a rotary shaft, a first bearing, a tank body, a first magnetism isolation ring, a first gasket ring, a first pole-shoe, a permanent magnet, a second pole-shoe, a second gasket ring, a second magnetism isolation ring, a second bearing, an end cover, a pole-tooth and a water delivery coating. The water delivery coating strips are coated on the an exterior circumferential surface of the rotary shaft at intervals, where each water delivery coating strip contains three parts with different water delivering directions individually.

1 Claim, 1 Drawing Sheet

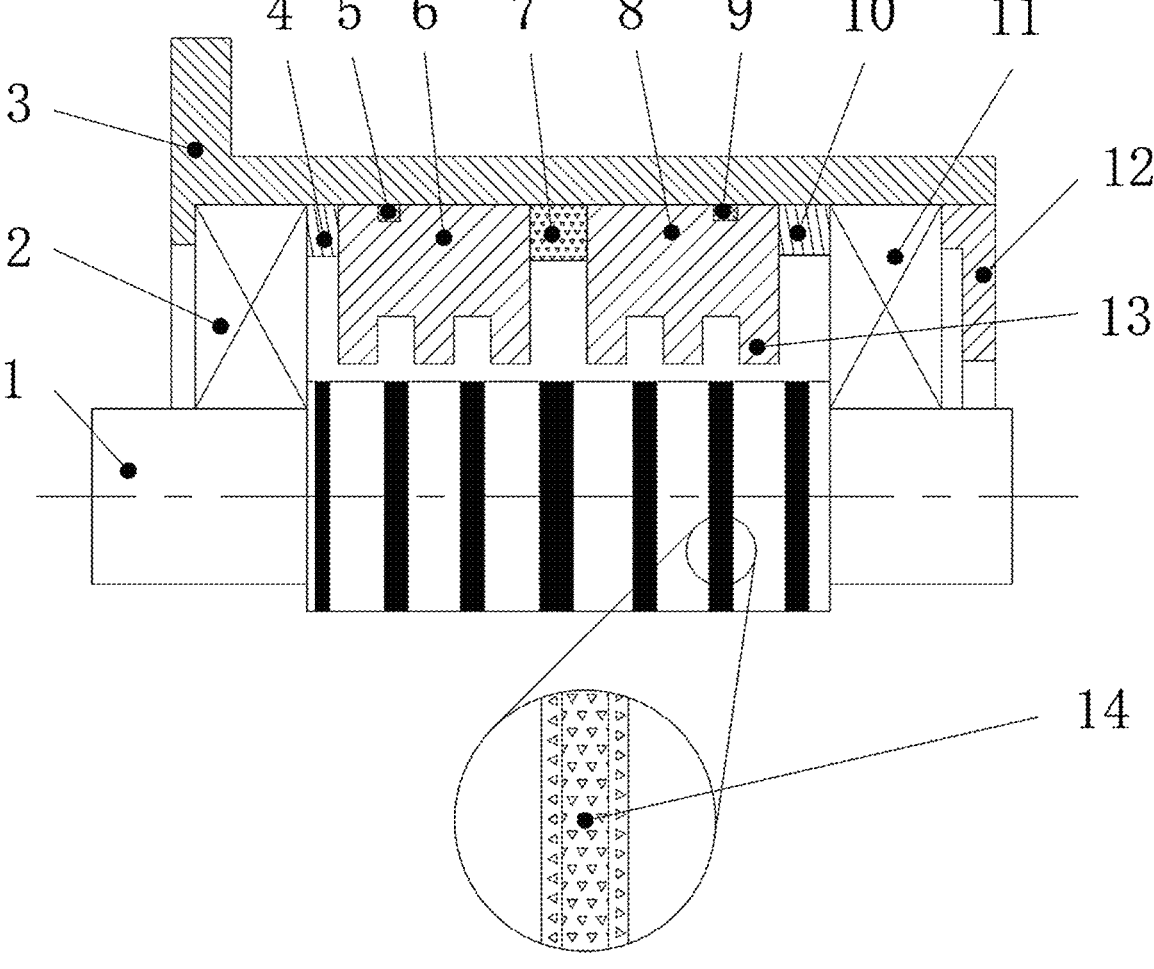

DEVICE SEALED WITH MAGNETIC LIQUID

CROSS-REFERENCE TO RELATED APPLICATIONS

This application claims priority to Chinese Patent Application No. 202211346154.7, filed on Oct. 31, 2022, the entire disclosure of which is incorporated herein by reference.

FIELD

The present disclosure relates to the technology field of mechanical engineering sealing, applicable to a device sealed with a water-based magnetic liquid.

BACKGROUND

A sealing with a magnetic liquid uses pole teeth to generate an intensive-and-weak alternate magnetic gradient, so as to gather the magnetic fluid to fill in spaces to be sealed, forming several sealing rings in an "O" shape for seal. There is no direct contact between the two surfaces for sealing, thereby having advantages of low friction and wear and high transmission efficiency. However, the water-based magnetic liquid has the problem of high loss in application due to its evaporable characteristic, and when used in a device sealed by a magnetic liquid a larger diameter, the magnetic liquid is affected by gravity, and thus cannot fill the spaces to be sealed evenly, thereby reversely affecting the service life and the pressure resistance of the magnetic liquid sealing. A common device sealed with a magnetic liquid cannot solve the problem of uneven filling of the magnetic liquid while reducing the loss of the magnetic liquid. Therefore, a device sealed with a water delivery coating strip applicable to a water-based magnetic liquid is provided.

SUMMARY

An object of the present disclosure is to provide a device sealed with a magnetic liquid, which, by a water delivery coating strip delivering water directionally thereby reducing the effect of gravity on the water-based magnetic liquid, reduces the loss of the water-based magnetic liquid, makes the water-based magnetic liquid fill in a space to be sealed evenly and improves the pressure resistance of the magnetic liquid sealing.

The present disclosure provides in embodiments a device sealed with a magnetic liquid, including: a rotary shaft, a first bearing, a tank body, a first magnetism isolation ring, a first gasket ring, a first pole-shoe, a permanent magnet, a second pole-shoe, a second gasket ring, a second magnetism isolation ring, a second bearing, an end cover, a pole-tooth and a water delivery coating strip, wherein the first gasket ring is installed within a first circular groove located at an exterior circumferential surface of the first pole-shoe, the second gasket ring is installed within a second circular groove located at an exterior circumferential surface of the second pole-shoe; the rotary shaft is provided along a circumferential direction with a plurality of the water delivery coating strips arranged at intervals at an exterior circumferential surface of the rotary shaft, for delivering water directionally; the rotary shaft has a first end and a second end in an axial direction, wherein the first bearing, the first magnetism isolation ring, the first pole-shoe, the permanent magnet, the second pole-shoe, and the second magnetism isolation ring are arranged at a radial side of the rotary shaft and installed in sequence along a direction from the first end to the second end of the rotary shaft inside the tank body, the first pole-shoe and the second pole-shoe each are provided with a plurality of the pole-teeth at their respective interior circumferential surfaces; a water-based magnetic liquid is filled in a space to be sealed between the exterior circumferential surface of the rotary shaft and the respective interior circumferential surfaces of the first pole-shoe and the second pole-shoe at the plurality of the pole-teeth; the second bearing is installed inside the tank body, the end cover is screwed into the tank body via threaded connection, so as to press the first bearing, the first magnetism isolation ring, the first pole-shoe, the permanent magnet, the second pole-shoe, the second magnetism isolation ring and the second bearing, and inner rings of the first bearing and the second bearing clamp first and second shaft shoulders of the rotary shaft respectively, thereby providing the rotary shaft with axial location; and the permanent magnet is of an axial magnetization direction.

In embodiments of the present disclosure, the water delivery coating strips are arranged at intervals at the exterior circumferential surface of the rotary shaft along the axial direction of the rotary shaft, and the plurality of the water delivery coating strips and the plurality of the pole-teeth are arranged in a stagger way. In embodiments of the present disclosure, each pole-tooth is provided at each side with one water delivery coating strip located at the exterior circumferential surface of the rotary shaft, while each pole-tooth is opposite the exterior circumferential surface of the rotary shaft without the water delivery coating strip. Each water delivery coating strip comprises a first part, a second part and a third part along axial the direction from the first end to the second end of the rotary shaft, wherein the first part delivers water axially in a first direction toward the first end; the second part delivers water in a second direction of shaft rotation; and the third part delivers water axially in a third direction toward the second end.

BRIEF DESCRIPTION OF THE DRAWINGS

FIG. 1 shows specific structure of a device sealed with a magnetic liquid according to embodiments of the present disclosure.

DRAWING REFERENCES rotary shaft (1), first bearing (2), tank body (3), first magnetism isolation ring (4), first gasket ring (5), first pole-shoe (6), permanent magnet (7), second pole-shoe (8), second gasket ring (9), second magnetism isolation ring (10), second bearing (11), end cover (12), pole-tooth (13), and water delivery coating strip (14).

DETAILED DESCRIPTION

The present disclosure is further illustrated with specific embodiments in conjunction with accompanying drawings. However, the following specific embodiments are only preferred embodiments of the present disclosure, and shall not be construed to limit the present disclosure.

As shown in FIG. 1, a device sealed with a magnetic liquid includes: a rotary shaft (1), a first bearing (2), a tank body (3), a first magnetism isolation ring (4), a first gasket ring (5), a first pole-shoe (6), a permanent magnet (7), a second pole-shoe (8), a second gasket ring (9), a second magnetism isolation ring (10), a second bearing (11), an end cover (12), a pole-tooth (13) and a water delivery coating strip (14), where the first gasket ring (5) is installed within a first circular groove located at an exterior circumferential surface of the first pole-shoe (6), the second gasket ring (9) is installed within a second circular groove located at an exterior circumferential surface of the second pole-shoe (8); the rotary shaft (1) is provided along a circumferential direction with a plurality of the water delivery coating strips (14) arranged at intervals at an exterior circumferential surface of the rotary shaft (1), for delivering water directionally; the rotary shaft (1) has a first end and a second end in an axial direction, wherein the first bearing (2), the first magnetism isolation ring (4), the first pole-shoe (6), the permanent magnet (7), the second pole-shoe (8), and the second magnetism isolation ring (10) are arranged at a radial side of the rotary shaft (1) and installed in sequence along a direction from the first end to the second end of the rotary shaft (1) inside the tank body (3), the first pole-shoe (6) and the second pole-shoe (8) each are provided with a plurality of the pole-teeth (13) at their respective interior circumferential surfaces; a water-based magnetic liquid is filled in a space to be sealed between the exterior circumferential surface of the rotary shaft (1) and the respective interior circumferential surfaces of the first pole-shoe (6) and the second pole-shoe (8) at the plurality of the pole-teeth (13); the second bearing (11) is installed inside the tank body (3), the end cover (12) is screwed into the tank body (3) via threaded connection, so as to press the first bearing (2), the first magnetism isolation ring (4), the first pole-shoe (6), the permanent magnet (7), the second pole-shoe (8), the second magnetism isolation ring (10) and the second bearing (11), and inner rings of the first bearing (2) and the second bearing (11) clamp first and second shaft shoulders of the rotary shaft (1) respectively, thereby providing the rotary shaft (1) with axial location; and the permanent magnet (7) is magnetized along the axial direction, where the permanent magnet (7) are respectively provided with an S pole and an N pole along the axial direction of the rotary shaft (1).

In embodiments of the present disclosure, the water delivery coating strips (14) are arranged at intervals at the exterior circumferential surface of the rotary shaft (1) along the axial direction of the rotary shaft (1), and the plurality of the water delivery coating strips (14) and the plurality of the pole-teeth (13) are arranged in a stagger way. In embodiments of the present disclosure, each pole-tooth (13) is provided at each side with one water delivery coating strip (14) located at the exterior circumferential surface of the rotary shaft (1), while each pole-tooth (13) is opposite the exterior circumferential surface of the rotary shaft (1) without the water delivery coating strip (14). Each water delivery coating strip (14) comprises a first part, a second part and a third part along the axial direction from the first end to the second end of the rotary shaft (1), wherein the first part delivers water axially in a first direction toward the first end; the second part delivers water in a second direction of shaft rotation; and the third part delivers water axially in a third direction toward the second end.

In embodiments of the present disclosure, the permanent magnet (7) is made of NdFeB (neodymium iron boron).

In embodiments of the present disclosure, the rotary shaft (1), the first pole-shoe (6) and the second pole-shoe (8) are all made of 2Cr13 with good magnetic permeability.

In embodiments of the present disclosure, the tank body (3), the first magnetism isolation ring (4) and the second magnetism isolation ring (10) are all made of materials with non-magnetic permeability.

A magnetic return path of the device provided in embodiments of the present disclosure is as follows. A magnetic field generated from the N pole of the permanent magnet (7) passes the second pole-shoe (8), the rotary shaft (1) and the first pole-shoe (6), and arrives at the S pole of the permanent magnet (7).

Working principle of the device provided in embodiments of the present disclosure is as follows.

When the water-based magnetic liquid is injected into the spaces to be sealed, there is no water-based magnetic liquid loss during it passing through the water delivery coating strip (14). The water-based magnetic liquid can pass through the first part and the third part of the water delivery coating strip (14) which deliver the liquid in directions towards the first end and the second end of the rotary shaft (1), respectively, without influences on distributions of the water-based magnetic liquid filled in the spaces, as the magnetic field under the pole-teeth (13) has an attractive force to the water-based magnetic liquid, stronger than repulsive forces to the water-based magnetic liquid resulting from the first part and the third part of the water delivery coating strip (14). When the water-based magnetic liquid passes the second part of the water delivery coating strip (14) which delivers the liquid in a direction of shaft rotation, the second part delivers the liquid directionally can counteract the influence of gravity on the water-based magnetic liquid, so that the water-based magnetic liquid can quickly fill in the spaces to be sealed along the circumferential direction, and the water-based magnetic liquid can be evenly filled in the spaces to be sealed, and the time required for forming a water-based magnetic liquid sealing ring can be shortened.

When the water-based magnetic liquid is injected, the magnetic liquid forms a complete sealing ring in an "O" shape under each pole-tooth (13) for seal. When there is a pressure at one side of the sealed device, the sealing ring of the water-based magnetic liquid under each pole-tooth (13) will deflect to another side without pressure, and when the water-based magnetic liquid contacts the first or third part of the water delivery coating strip (14) which is of no pressure, such a first or third part of the coating can offset a part of the pressure, thereby improving the pressure resistance of the sealed device.

Comparing with a common device sealed by a magnetic liquid, the device sealed with a magnetic liquid provided in embodiments of the present disclosure is of the following advantages.

i. There is no water-based magnetic liquid loss during it passing through the water delivery coating strip (14) when the water-based magnetic liquid is injected into the spaces to be sealed, and the water-based magnetic liquid can pass through the first part and the third part of the water delivery coating strip (14) which deliver the liquid in directions towards the first end and the second end of the rotary shaft (1), respectively, without influences on distributions of the water-based magnetic liquid filled in the spaces, as the magnetic field under the pole-teeth (13) has an attractive force to the water-based magnetic liquid, stronger than repulsive forces to the water-based magnetic liquid resulting from the first part and the third part of the water delivery coating strip (14).

ii. When the water-based magnetic liquid passes the second part of the water delivery coating strip (14) which delivers the liquid in a direction of shaft rotation, the second part delivers the liquid directionally can counteract the influence of gravity on the water-based magnetic liquid, so that the water-based magnetic liquid can quickly fill in the spaces to be sealed along the circumferential direction, and the water-based magnetic liquid can be evenly filled in the spaces to be sealed, and the time required for forming a water-based magnetic liquid sealing ring can be shortened.

iii. When the water-based magnetic liquid is injected, the magnetic liquid forms a complete sealing ring in an "O" shape under each pole-tooth (13) for seal. When there is a pressure at one side of the sealed device, the sealing ring of the water-based magnetic liquid under each pole-tooth (13) will deflect to another side without pressure, and when the water-based magnetic liquid contacts the first or third part of the water delivery coating strip (14) which is of no pressure, such a first or third part of the coating can offset a part of the pressure, thereby improving the pressure resistance of the sealed device.

In the specification, it should be understood that, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation or position relationship as then described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A device sealed with a magnetic liquid, comprising: a rotary shaft, a first bearing, a tank body, a first magnetism isolation ring, a first gasket ring, a first pole-shoe, a permanent magnet, a second pole-shoe, a second gasket ring, a second magnetism isolation ring, a second bearing, an end cover, a pole-tooth and a water delivery coating strip, wherein:

the first gasket ring is installed within a first circular groove located at an exterior circumferential surface of the first pole-shoe, the second gasket ring is installed within a second circular groove located at an exterior circumferential surface of the second pole-shoe; the rotary shaft is provided along a circumferential direction with a plurality of water delivery coating strips arranged at intervals at an exterior circumferential surface of the rotary shaft, for delivering water directionally;

the rotary shaft has a first end and a second end in an axial direction, wherein the first bearing, the first magnetism isolation ring, the first pole-shoe, the permanent magnet, the second pole-shoe, and the second magnetism isolation ring are arranged at a radial side of the rotary shaft and installed in sequence along a direction from the first end to the second end of the rotary shaft inside the tank body, the first pole-shoe and the second pole-shoe each are provided with a plurality of pole-teeth at their respective interior circumferential surfaces;

a water-based magnetic liquid is filled in a space to be sealed between the exterior circumferential surface of the rotary shaft and the respective interior circumferential surfaces of the first pole-shoe and the second pole-shoe at the plurality of pole-teeth;

the second bearing is installed inside the tank body, the end cover is screwed into the tank body via threaded connection, so as to press the first bearing, the first magnetism isolation ring, the first pole-shoe, the permanent magnet, the second pole-shoe, the second magnetism isolation ring and the second bearing; and inner rings of the first bearing and the second bearing clamp first and second shaft shoulders of the rotary shaft respectively, thereby providing the rotary shaft with axial location;

the permanent magnet is of an axial magnetization direction;

the plurality of water delivery coating strips are arranged at intervals at the exterior circumferential surface of the rotary shaft along the axial direction of the rotary shaft;

the plurality of water delivery coating strips and the plurality of pole-teeth are arranged in a stagger way;

each pole-tooth is provided at each side with one water delivery coating strip located at the exterior circumferential surface of the rotary shaft, while each pole-tooth is opposite the exterior circumferential surface of the rotary shaft without the water delivery coating strip;

each water delivery coating strip comprises a first part, a second part and a third part along the axial direction from the first end to the second end of the rotary shaft;

the first part delivers water axially in a first direction toward the first end;

the second part delivers water in a second direction of shaft rotation; and the third part delivers water axially in a third direction toward the second end.

* * * * *